(12) United States Patent
Hill et al.

(10) Patent No.: US 12,280,866 B2
(45) Date of Patent: Apr. 22, 2025

(54) PNEUMO-MECHANICAL LANDING GEAR DEPLOYMENT SYSTEM AND METHOD

(71) Applicant: Textron Aviation Inc., Wichita, KS (US)

(72) Inventors: Donald Edward Hill, Wichita, KS (US); Michael R. DePinto, Wichita, KS (US); Matthew J. Allmond, Wichita, KS (US); Michael Troy Heeren, Wichita, KS (US); Dennis Scarberry, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 4 days.

(21) Appl. No.: 18/345,749

(22) Filed: Jun. 30, 2023

(65) Prior Publication Data

US 2024/0002040 A1    Jan. 4, 2024

Related U.S. Application Data

(60) Provisional application No. 63/357,895, filed on Jul. 1, 2022.

(51) Int. Cl.
*B64C 25/20* (2006.01)
*B64C 25/26* (2006.01)
*B64C 25/30* (2006.01)

(52) U.S. Cl.
CPC .............. *B64C 25/20* (2013.01); *B64C 25/26* (2013.01); *B64C 25/30* (2013.01)

(58) Field of Classification Search
CPC ......... B64C 25/10; B64C 25/18; B64C 25/20; B64C 25/24; B64C 25/26; B64C 25/30
See application file for complete search history.

(56) References Cited

U.S. PATENT DOCUMENTS

| | | | |
|---|---|---|---|
| 8,191,827 B2 | 6/2012 | Reynes |
| 10,301,846 B2 | 5/2019 | Macaraeg |
| 10,364,022 B2 | 7/2019 | Bond et al. |
| 10,689,098 B2 | 6/2020 | Waltner |
| 10,894,597 B2 | 1/2021 | Persico |
| 11,192,640 B2 | 12/2021 | Pierra et al. |
| 11,299,261 B2 | 4/2022 | Kerr et al. |

*Primary Examiner* — Richard G Davis
(74) *Attorney, Agent, or Firm* — Avek IP, LLC

(57) ABSTRACT

A pneumo-mechanical landing gear deployment system includes a dual-stage handle operatively connected to a pressurized tank, a nose landing gear pneumatically connected to the pressurized tank, and a main landing gear pneumatically connected to the pressurized tank. Actuation of the dual-stage handle to a first position opens the pressurized tank thereby deploying the nose landing gear. Actuation of the dual-stage handle to a second position causes further opening of the pressurized tank thereby deploying the main landing gear. The system may be employed as a backup landing gear deployment system in the case of a primary landing gear system failure.

16 Claims, 3 Drawing Sheets

PNEUMO-MECHANICAL LANDING GEAR DEPLOYMENT SYSTEM AND METHOD

CROSS-REFERENCE TO RELATED APPLICATIONS

This application claims the benefit of priority of U.S. Provisional Patent Application No. 63/357,895, entitled Electro-Mechanical Landing Gear Actuation and filed on Jul. 1, 2022, the disclosure of which is herein incorporated by reference in its entirety.

BACKGROUND

1. Field

Embodiments of the invention relate generally to aircraft landing gear, and more specifically to an electro-mechanical landing gear deployment system.

2. Related Art

Various solutions have been proposed for deploying or retracting systems in an aircraft. For example, U.S. Pat. No. 10,301,846 to Macaraeg, Jr. discloses a release mechanism for a support assembly. U.S. Pat. No. 10,689,098 to Waltner discloses a landing gear assembly of an aircraft. U.S. Pat. No. 10,364,022 to Bond et al. discloses a rotary unlock actuator of a landing gear assembly. Various other control systems for landing gears are disclosed in U.S. Pat. No. 8,191,827 to Reynes, U.S. Pat. No. 10,894,597 to Persico, U.S. Patent Application Publication No. 2018/0244374 to Pierra et al., and U.S. Patent Application Publication No. 2020/0277044 to Kerr et al.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a pneumo-mechanical landing gear deployment system includes: a dual-stage handle operatively connected to a pressurized tank; a nose landing gear pneumatically connected to the pressurized tank; and a main landing gear pneumatically connected to the pressurized tank, wherein actuation of the dual-stage handle to a first position opens the pressurized tank thereby deploying the nose landing gear; wherein actuation of the dual-stage handle to a second position causes further opening of the pressurized tank thereby deploying the main landing gear.

In another embodiment, a method for deploying a nose landing gear and a main landing gear using a pneumo-mechanical landing gear deployment system includes: actuating a dual-stage handle to a first position, the dual-stage handle being operatively connected to a pressurized tank and a shutoff valve; releasing a pressurized gas from the pressurized tank based on the first position of the dual-stage handle and directing the pressurized gas towards the nose landing gear; releasing the nose landing gear from a retracted position, wherein the nose landing gear is released by the pressurized gas; locking the nose landing gear in an extended position; actuating the dual-stage handle to a second position thereby opening the shutoff valve; directing additional pressurized gas to the main landing gear, thereby releasing the main landing gear from a retracted position; and locking the main landing gear in an extended position.

In yet another embodiment, a method of servicing a pneumo-mechanical landing gear deployment system includes: deploying a nose landing gear and a main landing gear via a pressurized gas; retracting, partially, the nose landing gear and the main landing gear; relieving pressure from the pneumo-mechanical landing gear deployment system by releasing the pressurized gas via a relief valve; extending the nose landing gear and the main landing gear; closing a shutoff valve disposed pneumatically downstream of a pressurized tank; closing a release valve disposed at the pressurized tank; and repressurizing the pressurized tank.

BRIEF DESCRIPTION OF THE DRAWING FIGURES

Embodiments of the invention are described in detail below with reference to the attached drawing figures, wherein.

Figure 1:
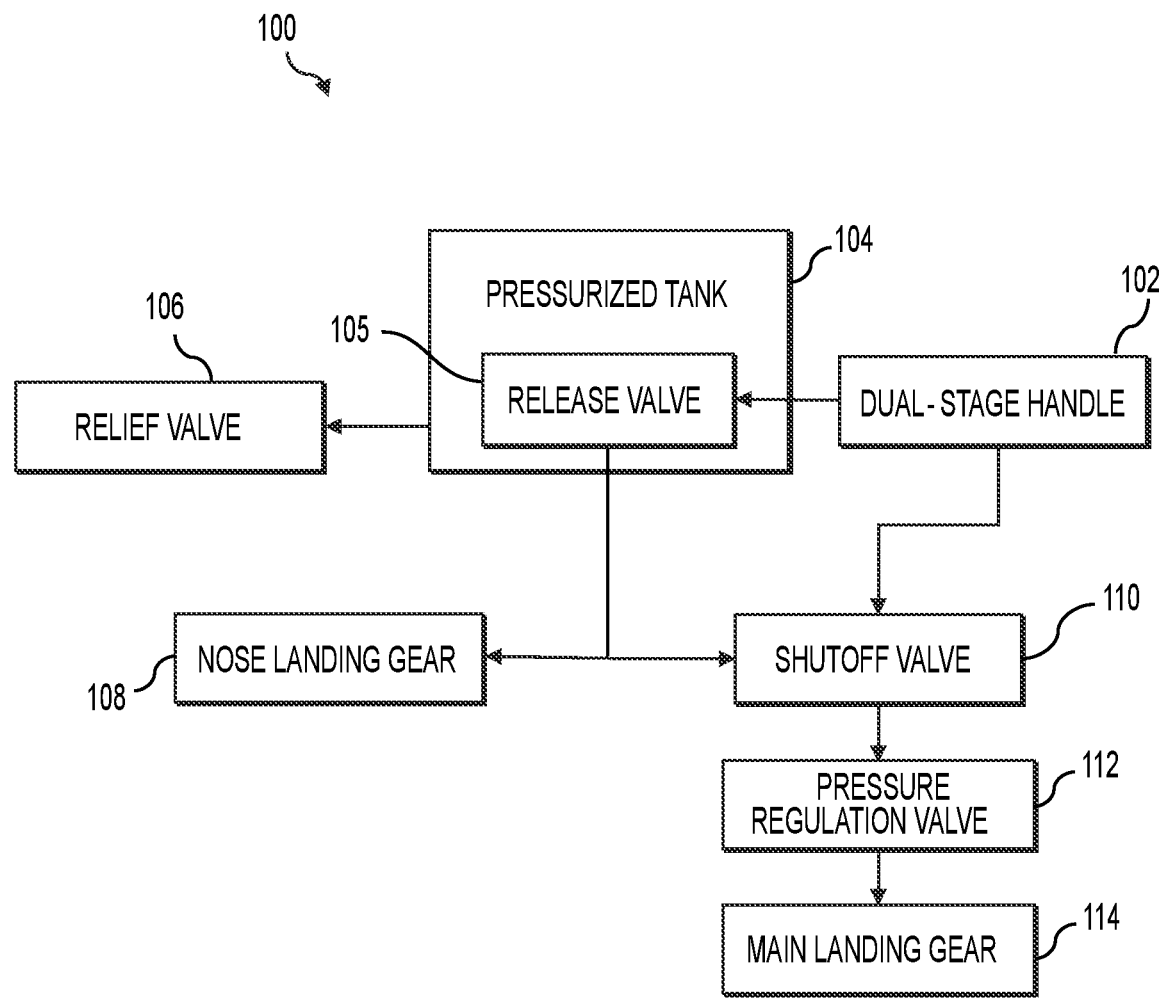
FIG. 1 illustrates a pneumo-mechanical landing gear system of some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Current methods of landing gear actuation typically require the use of hydraulic systems to raise or lower the landing gears. In the case of a system malfunction, a single-step pneumatic system may be used to drive the hydraulic fluid and extend the landing gears. Using pressurized gas within the hydraulic lines requires substantial maintenance to service the lines and prepare the aircraft for flight following deployment of the system. For example, the hydraulic lines have to be fully bled of the pressurized gas, and subsequently repressurized with hydraulic fluid prior to flying again.

What is needed is a system and method of deploying landing gear without the use of hydraulic pressure and pressurized gas into the hydraulic fluid system when experiencing a system malfunction. Embodiments described herein utilize a two-step pneumo-mechanical backup system to deploy landing gear during a primary landing gear system malfunction. The pneumo-mechanical backup landing gear system operates independently of the primary landing gear system. Embodiments of the invention solve the above-described problems and provide a distinct advance in the art by providing an independent backup method and system for deploying landing gear in the event of system malfunction without introduction of pressurized gas into a hydraulic fluid landing gear system.

In some embodiments, the pneumo-mechanical backup landing gear system described herein is used onboard an aircraft having an electro-mechanical landing gear actuator (EMLGA) employed as the primary means of deploying and retracting the landing gear. Compared with a typical hydraulic-powered landing gear system, overall weight, system complexity, and servicing requirements are reduced. The EMLGA may include an electric motor in series with pinion gears and a roller screw to extend and retract the landing gear in normal (primary) mode. The secondary (backup emergency) system provides pneumo-mechanical deployment utilizing stored gas pressure from an onboard source to 1) internally disconnect an actuator ram from the primary electro-mechanical drivetrain system including a primary extension/retraction roller screw, and then 2) extend and lock the actuator ram to lock the landing gear in the down/landing position.

FIG. 1 illustrates a pneumo-mechanical landing gear deployment system 100, in some embodiments. The pneumo-mechanical landing gear deployment system 100 may be accessible to a user via a dual-stage handle 102. For example, the dual-stage handle 102 may be disposed in a location onboard the aircraft that is accessible to a pilot, co-pilot, and/or crew member. In some embodiments, the dual-stage handle 102 is disposed within the cockpit of an aircraft. As will be discussed in greater detail below, the dual-stage handle 102 has two different stages (e.g., positions) which regulate certain aspects of the deployment of the landing gears. In some embodiments, the dual-stage handle 102 may be a rotatable handle, a translatable handle, a lever, a wheel, a pedal, or any other mechanical device configured to allow for actuation of two separate stages.

In some embodiments, the dual-stage handle 102 is connected to a pressurized tank 104. The pressurized tank 104 provides pneumatic force to the pneumo-mechanical landing gear deployment system 100. In embodiments, the pressurized tank 104 comprises a high-pressure nitrogen storage container. The pressurized tank 104 may be located anywhere onboard the aircraft so as to most effectively drive the system. For example, the pressurized tank 104 may be located in the nose of the aircraft, unpressurized compartment of the aircraft, the cabin of the aircraft, the tail of the aircraft, etc. As will be discussed below, placement of the pressurized tank 104 allows for ease of access for servicing the pneumo-mechanical landing gear deployment system 100 following use. For example, a relief valve 106 for releasing pressurized gas as well as a valve for refilling the pressurized tank 104 may be readily accessible to a user. Alternatively, the relief valve 106 may be used to both relieve pressure from pneumo-mechanical landing gear deployment system 100 as well as repressurize the pressurized tank 104.

A release valve 105 located at the pressurized tank 104 may be operatively coupled to the dual-stage handle 102. For example, the dual-stage handle 102 may be connected to the release valve 105 of the pressurized tank 104 via a cable, wire, bell crank, tie-rods, etc. In some embodiments, as discussed in greater detail below, actuation of the dual-stage handle 102 may release pressurized gas from the pressurized tank 104 via the release valve 105 into the pneumatic system. For example, a first stage of the dual-stage handle 102 may open the release valve 105 on the pressurized tank 104 by a predetermined amount or for a predetermined duration to release a predetermined amount of pressurized gas. In some embodiments, the pressurized gas released through the release valve 105 will be directed towards and cause deployment of a nose landing gear 108. Further, the pressurized gas may be directed towards a shutoff valve 110 which may prevent further travel of the pressurized gas towards a main landing gear 114 until the shutoff valve 110 is opened.

In embodiments, the dual-stage handle 102 is operatively coupled to the shutoff valve 110. For example, the dual-stage handle 102 may be connected to the shutoff valve 110 via a cable, wire, bell crank, tie-rods, etc. As will be discussed in greater detail below, a second stage of the dual-stage handle 102 may actuate the shutoff valve 110, thereby allowing the pressurized gas to pass therethrough. For example, pressurized gas may be blocked from passing through the shutoff valve 110 when the first stage of the dual-stage handle 102 is reached. However, upon actuation of the dual-stage handle 102 to the second stage, the shutoff valve 110 may be opened, thereby allowing additional pressurized gas to be directed towards the main landing gear 114.

In some embodiments, the pressurized gas directed towards the main landing gear 114 is regulated by a pressure regulation valve 112. For example, pressurized gas at too high a pressure may damage components of the main landing gear 114. Accordingly, pressure regulation valve 112 may be configured to regulate the pressurized gas passing therethrough at a predetermined pressure so as to avoid damaging the main landing gear 114. In some embodiments, the pressure regulation valve 112 may allow for bidirectional pneumatic flow. In some embodiments, main landing gear 114 may be partially deployed by gravitational force. In these embodiments, the pneumatic pressure provided by the pressurized gas may only be needed to decouple certain components of the main landing gear 114 so as to allow gravity to pull down (i.e., deploy) the main landing gear 114.

Pneumatic coupling between components of the pneumo-mechanical landing gear deployment system 100 may be by any means commonly known to one of ordinary skill in the art. For example, pneumatic coupling may be by that of plastic tubing, metal tubing, a combination of metal and plastic, etc. Similarly, pneumatic pressure may be maintained within the pneumo-mechanical landing gear deployment system 100 using sealant methods commonly known to one skilled in the art. For example, any number of seals, tape, O-rings, etc. may be used to maintain pressure within the pneumatically-connected components of the pneumo-mechanical landing gear deployment system 100 when the pressurized gas is released.

Figure 2:
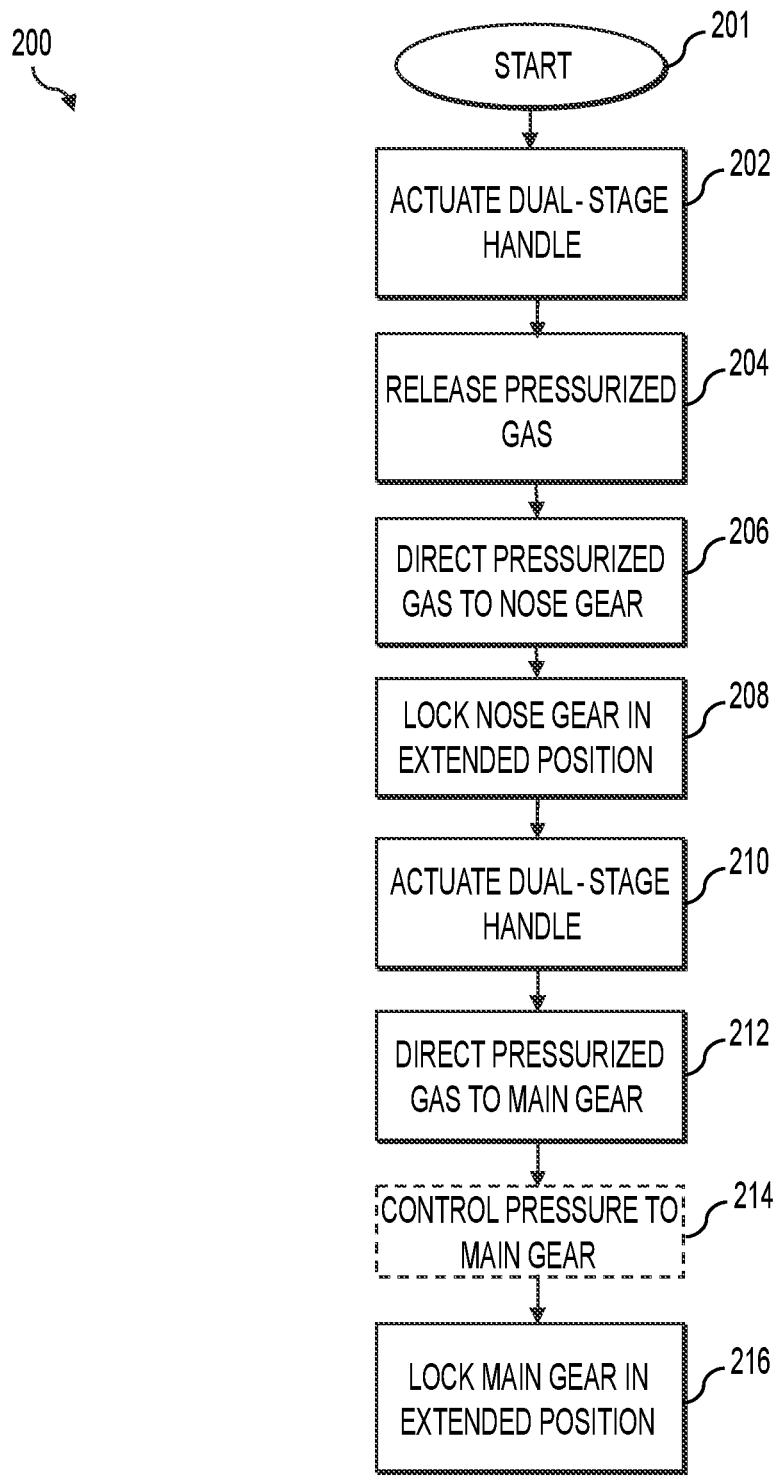
FIG. 2 illustrates a deployment method for the pneumo-mechanical landing gear system of FIG. 1, in some embodiments.

FIG. 2 illustrates a deployment method 200 of the pneumo-mechanical landing gear deployment system 100, in some embodiments.

In a step 201, the deployment method 200 starts. In an example of step 201, a system malfunction may be detected with the landing gear of an aircraft. For example, an electro-mechanical landing gear actuator (EMLGA) may lose electrical power.

In a step 202, the dual-stage handle is actuated to a first position. In an example of step 202, a user (e.g., a pilot) actuates dual-stage handle 102. In some embodiments, the user may actuate the dual-stage handle 102 to a first stage (i.e., first position). For example, the first stage may be translating the dual-stage handle 102 a certain distance, rotating the dual-stage handle 102 to a certain angle, etc.

In a step 204, pressurized gas from a pressurized tank is released. In an example of step 204, pressurized gas is released from pressurized tank 104 via the release valve 105. As discussed above, the dual-stage handle 102 is operatively coupled to the release valve 105 of pressurized tank 104. Accordingly, upon actuation of the dual-stage handle in step 202 to the first position, the release valve 105 is opened, thereby releasing pressurized gas.

In a step 206, the pressurized gas is directed to the nose landing gear. In an example of step 206, pressurized gas from pressurized tank 104 is directed to nose landing gear 108 by pneumatical connections. For example, tubing may connect the release valve 105 of the pressurized tank 104 to the nose landing gear 108. In some embodiments, the pneumatic connection is a "T-shaped" connection, such that all the pressurized gas from pressurized tank 104 exits via the same port, and then splits directions towards both the nose landing gear 108 and the shutoff valve 110 (e.g., see FIG. 1).

In a step 208, the nose landing gear is locked in the extended configuration. In an example of step 208, the pressurized gas causes disconnection of components within the nose landing gear 108 that allow for extension. For example, the pressurized gas may cause disconnection of a screw (e.g., roller screw, power screw, ball screw, etc.) and/or an actuator ram that are a part of nose landing gear 108. Further, in embodiments in which the nose landing gear 108 rotates outwardly in the fore direction (i.e., against the airstream), the pressurized gas may provide substantial force to overcome the aerodynamic forces exerted on the nose landing gear 108 as it swings in the fore direction. Once extended, other secondary extension mechanisms, such as an actuator ram, may lock the nose landing gear 108 in the extended position. In some embodiments, the pilot or crew member may be notified that the nose landing gear 108 is fully extended and locked. In some embodiments, the dual-stage handle 102 may be locked in the first position until confirmation is received that the nose landing gear 108 is fully deployed and locked.

In a step 210, the dual-stage handle is actuated to a second position. In an example of step 210, a user (e.g., a pilot) actuates dual-stage handle 102. In some embodiments, the user may actuate the dual-stage handle 102 to a second stage (i.e., second position). For example, the second stage may be translating the dual-stage handle 102 a certain distance, rotating the dual-stage handle 102 to a certain angle, etc. In some embodiments, transition of the dual-stage handle 102 from the first stage to the second stage includes rotating the dual-stage handle 102 and further translating the dual-stage handle 102 following rotation.

In a step 212, the pressurized gas is directed to the main landing gear. In an example of step 212, a shutoff valve (e.g., shutoff valve 110) may be actuated by movement of the dual-stage handle 102 from the first position to the second position, such as in step 210. Accordingly, the shutoff valve 110 may be opened. Since pressurized gas was released in step 204, the pressurized gas readily travels through the shutoff valve 110 towards the main landing gear 114.

In an optional step 214, the pressure directed towards the main landing gear is controlled. In an example of step 214, a valve (e.g., pressure regulation valve 112) may regulate the rate of pressurized gas allowed therethrough. Such regulation of the pressure that reaches the main landing gear 114 may prevent damage of critical components of main landing gear 114 while still allowing for release of the main landing gear 114 from the retracted position.

In a step 216, the main landing gear is locked in an extended position. In an example of step 216, the pressurized gas causes disconnection of components within the main landing gear 114, thereby allowing for extension. For example, the pressurized gas may cause disconnection of a screw (e.g., roller screw, power screw, ball screw, etc.) and/or an actuator ram that are a part of the main landing gear 114. Further, in embodiments in which the main landing gear 114 rotates outwardly in the transverse direction (i.e., perpendicular to the fore direction), the pressurized gas may not need to provide substantial force to overcome any aerodynamic forces. For example, gravitational force may be sufficient to cause main landing gear 114 to fully extend once the pressurized gas releases the main landing gear 114 from the retracted position. In these embodiments, it may be important to decrease the pressure of the pressurized gas prior to reaching the main landing gear 114, as discussed above regarding optional step 214. Once extended, other secondary extension mechanisms, such as an actuator ram, may lock the main landing gear 114 in the extended position. Locking of main landing gear 114 may require pressurized gas. For example, in some embodiments and as mentioned above, gravity may aid in lowering of main landing gear 114, but pressurized gas may be needed to lock main landing gear 114 via extending the other secondary extension mechanisms. In some embodiments, the pilot or crew member may be notified that the main landing gear 114 is fully extended and locked.

Figure 3:
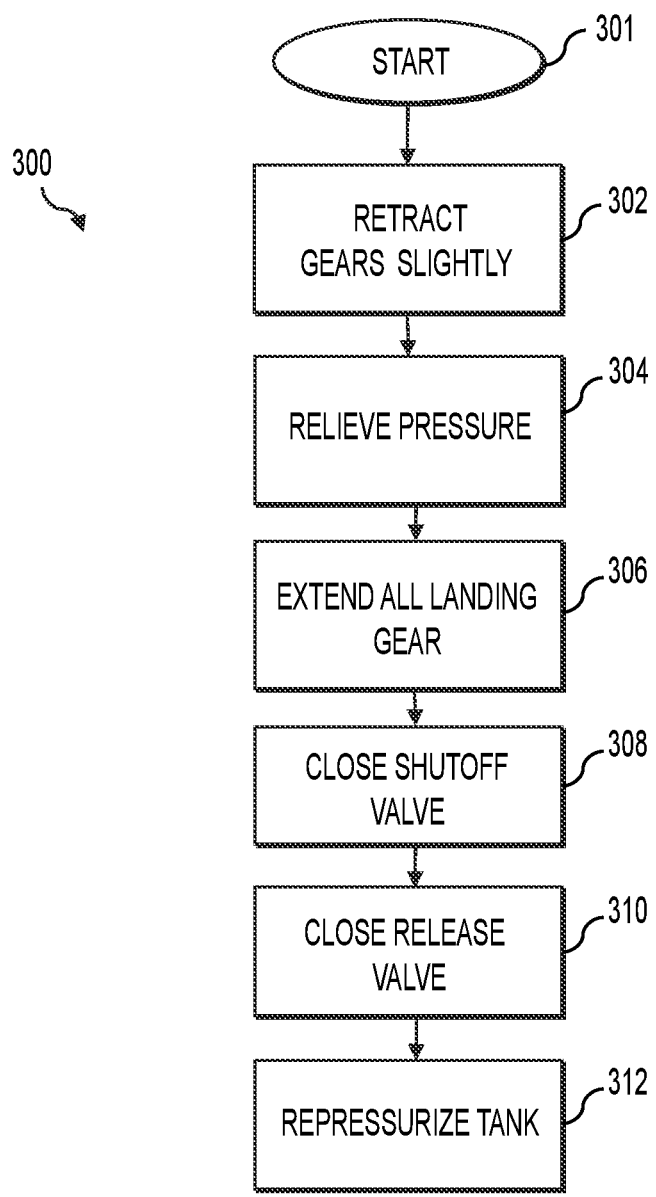
FIG. 3 illustrates a servicing method for the pneumo-mechanical landing gear system of FIG. 1, in some embodiments.

FIG. 3 illustrates a servicing method 300 of the pneumo-mechanical landing gear deployment system 100, in some embodiments.

In a step 301, the servicing method 300 starts. In an example of step 301, an aircraft has experienced a malfunction and the pneumo-mechanical landing gear deployment system 100 has been deployed (e.g., via deployment method 200). Accordingly, the pneumo-mechanical landing gear deployment system 100 needs servicing before subsequent flight of the aircraft.

In a step 302, all landing gear are retracted slightly. In an example of step 302, the nose landing gear 108 and main landing gear 114 are slightly, or partially retracted from the extended position. For example, nose landing gear 108 and main landing gear 114 may be fully extended and locked in step 216. Accordingly, a user may unlock the secondary extension components of nose landing gear 108 and main landing gear 114. Following unlocking of the landing gears 108, 114, a user may partially retract each gear. Partial retraction of nose landing gear 108 and main landing gear 114 may entail retracting the gears between about 1% to about 10% of the fully extended position to the fully retracted position.

In a step 304, the pressure is relieved from the system. In an example of step 304, pressurized gas is maintained (i.e., sealed) within components of the pneumo-mechanical landing gear deployment system 100 (e.g., nose landing gear 108, main landing gear 114, pressure regulation valve 112, shutoff valve 110, tubing, etc.). As such, the pressurized gas is released by opening a relief valve (e.g., relief valve 106), thereby relieving pressure from the pneumo-mechanical landing gear deployment system 100. In some embodiments, the relief valve 106 may be configured to release all the pressurized gas stored within the nose landing gear 108 and main landing gear 114. Additionally, the relief valve 106 may be configured to release any extra pressurized gas still stored within pressurized tank 104. Optionally, a vacuum may be used to aid in relief of any residual pressure on any components.

In a step 306, the landing gears are extended. In an example of step 306, both the nose landing gear 108 and the main landing gear 114 are placed in the extended position. In some embodiments, this requires movement of an actuator ram from the unlocked position to a locked position.

In a step 308, the shutoff valve is closed. In an example of step 308, shutoff valve 110 is closed manually by actuating a shutoff valve handle. In some embodiments, shutoff valve 110 is accessible from an inner compartment of the aircraft (e.g., the cockpit) and thus may be closed by one or more crew members (e.g., a pilot). In some embodiments, actuation of dual-stage handle 102 (e.g., from the second position to the first position) may cause the shutoff valve 110 to close.

In a step 310, the release valve of the pressurized tank is closed. In an example of step 310, release valve 105 is closed manually by actuating the release valve handle. In some embodiments, release valve 105 has a release valve handle operable and accessible from within a compartment of the aircraft (e.g., the nose compartment). Accordingly, crew members may actuate the release valve handle, thereby closing release valve 105. In other embodiments, actuation of dual-stage handle 102 (e.g., from the first position to an initial starting position) may cause the release valve 105 to close.

In a step 312, the pressurized tank is repressurized. In an example of step 312, a user delivers pressurized gas to the pressurized tank 104. In some embodiments, a user may repressurize the pressurized tank 104 via the relief valve 106. In other embodiments, the pressurized tank 104 may include a separate valve (not shown) that allows pressurized tank 104 to be repressurized.

The pneumo-mechanical landing gear deployment system 100, along with deployment method 200 and servicing method 300 provide substantial improvements upon existing systems. As discussed above, by not using hydraulic systems onboard the aircraft, the overall weight of the system is substantially decreased, thereby increasing additional weight (e.g., cargo, passengers, etc.) that can be loaded onboard and/or increasing efficiency of the aircraft during flight. As also discussed above, the servicing method 300 greatly improves upon current systems that require the hydraulic system to be fully bled following use. This substantially decreases the time and cost of servicing the aircraft.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

What is claimed is:

1. A pneumo-mechanical landing gear deployment system, comprising:
   a dual-stage handle operatively connected to a pressurized tank;
   a nose landing gear pneumatically connected to the pressurized tank; and
   a main landing gear pneumatically connected to the pressurized tank,
      wherein actuation of the dual-stage handle to a first position opens the pressurized tank thereby deploying the nose landing gear;
      wherein actuation of the dual-stage handle to a second position causes further opening of the pressurized tank thereby deploying the main landing gear.

2. The system of claim 1, comprising a screw configured to secure the nose landing gear in a retracted position, wherein pressurized gas from the pressurized tank causes disconnection of the screw upon actuation of the dual-stage handle to the first position.

3. The system of claim 1, comprising a release valve operatively coupled to the pressurized tank and the dual-stage handle, wherein the release valve is configured to release a predetermined amount of pressure from the pressurized tank via actuation of the dual-stage handle to the first position.

4. The system of claim 1, comprising a shutoff valve operatively coupled to the pressurized tank and the dual-stage handle, wherein the shutoff valve is configured to release a predetermined amount of pressure from the pressurized tank to the main landing gear via actuation of the dual-stage handle to the second position.

5. The system of claim 4, comprising a pressure regulation valve operatively coupled between the shutoff valve and the main landing gear, wherein the pressure regulation valve is configured to regulate pressurized gas at a predetermined pressure to avoid damaging the main landing gear.

6. The system of claim 5, wherein the pressure regulation valve is configured to allow bidirectional pneumatic flow.

7. The system of claim 1, wherein the main landing gear is configured to be deployed partially by gravitational force and partially by pneumatic pressure provided by pressurized gas from the pressurized tank, wherein the pressurized gas is configured to disconnect components of the main landing gear thereby enabling deployment of the main landing gear via gravitational force.

8. The system of claim 7, wherein the pressurized gas is configured to disconnect an actuator ram of the main landing gear thereby enabling deployment of the main landing gear via gravitational force.

9. The system of claim 1, comprising a relief valve configured for releasing pressurized gas from the pneumo-mechanical landing gear deployment system.

10. The system of claim 9, wherein the relief valve is readily accessible to a user and configured to as a valve for repressurizing the pressurized tank.

11. A method for deploying a nose landing gear and a main landing gear using a pneumo-mechanical landing gear deployment system, the method comprising:
   actuating a dual-stage handle to a first position, the dual-stage handle being operatively connected to a pressurized tank and a shutoff valve;
   releasing a pressurized gas from the pressurized tank based on the first position of the dual-stage handle and directing the pressurized gas towards the nose landing gear;

releasing the nose landing gear from a retracted position, wherein the nose landing gear is released by the pressurized gas;

locking the nose landing gear in an extended position;

actuating the dual-stage handle to a second position thereby opening the shutoff valve;

directing additional pressurized gas to the main landing gear, thereby releasing the main landing gear from a retracted position; and locking the main landing gear in an extended position.

12. The method of claim 11, wherein releasing from the pressurized tank a first amount of pressurized gas comprises opening a release valve operatively coupled to the pressurized tank via the dual-stage handle.

13. The method of claim 11, wherein releasing the nose landing gear from a retracted position comprises disconnection of a component within the nose landing gear via the pressurized gas.

14. The method of claim 11, comprising fully deploying the nose landing gear in a fore direction, wherein the pressurized gas overcomes an aerodynamic force exerted on the nose landing gear as the nose landing gear swings in the fore direction.

15. The method of claim 11, comprising regulating an amount of pressurized gas from the shutoff valve to the main landing gear via a pressure regulation valve to avoid high pressure from damaging components of the main landing gear.

16. The method of claim 11, wherein locking the main landing gear in an extended position comprises providing pressurized gas to the main landing gear to lock the main landing gear in a fully extended and locked position.

\* \* \* \* \*